UNITED STATES PATENT OFFICE.

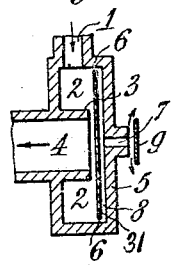
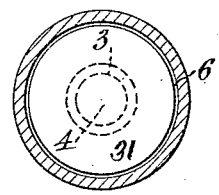
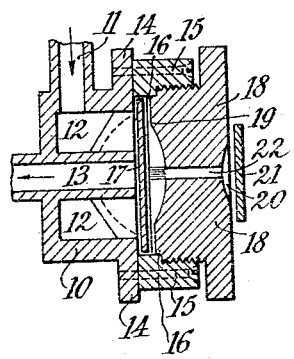
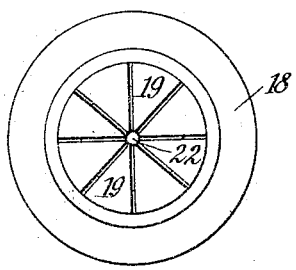
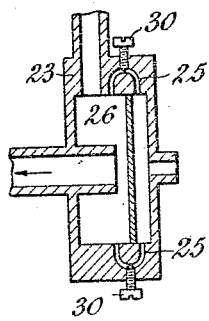

GEORGES LAUDET AND LÉON GAUMONT, OF PARIS, FRANCE, ASSIGNORS TO SOCIÉTÉ DES ETABLISSEMENTS GAUMONT, OF PARIS, FRANCE.

ENERGY-RELAY.

1,014,235.

Specification of Letters Patent. Patented Jan. 9, 1912.

Application filed July 2, 1910. Serial No. 570,192.

*To all whom it may concern:*

Be it known that we, GEORGES LAUDET and LÉON GAUMONT, residing in Paris, France, and both citizens of the Republic of France, have invented certain new and useful Improvements in Energy-Relays, of which the following is a specification.

This invention relates to improvements in energy relays and has for its object one which is intended for the amplification of any movement or vibration by means of all fluids, liquids or vapors, by pressure or vacuum. It may be constructed of all sizes from the apparatus intended for infinitely small and rapid vibrations to the apparatus intended for opening the steam valves of steam generators capable of driving engines of several hundred horse power.

In this apparatus the energy is produced by the opening and the modification of the delivery of a fluid under pressure or vacuum obtained by the application to the discharge orifices of a free, rigid or soft washer held upon these orifices by the pressure exerted by a derivation from the principal current.

This apparatus is characterized by the fact that a single admission of compressed fluid is sufficient to supply the relay and the branch serving to insure the operation of the relay.

The invention is illustrated by way of example in the accompanying drawing in which:—

Figure 1 is a diagram intended to show the method of operation. Fig. 2 is a section on Fig. 1 showing the movable washer and the interval which separates it from the inner part of the chamber. Fig. 3 is a section of the apparatus as constructed commercially. Fig. 4 represents the front part of the apparatus viewed axially. Fig. 5 represents an arrangement in which the washer slides in forming a joint in the body of the apparatus.

Through a conduit 1 (Fig. 1) the fluid enters an annular chamber 2 (Fig. 2) in which a perfectly free washer 31 is arranged. Under the influence of the pressure this washer becomes displaced and the fluid flows through the conduit 4. The washer acted upon by the pressure of the fluid becomes applied to the bottom 5. Upon this bottom 5 grooves or depressions are formed (see Fig. 4) so that the washer cannot form a perfect joint when applied but a small quantity of fluid under pressure is able to pass to the point 6 between the periphery of the washer and the wall of the chamber and flow through the orifice 7.

If it be desired to obturate the orifice 7, the pressure fluid which passes around the washer 31, being unable to flow out, acquires in the space 8 the pressure of the admission conduit and as this pressure is exerted upon the entire surface while on the other side it is exerted only upon the crown externally, the washer becomes applied to the edges of the orifice 3 and blocks the outlet for the fluid.

If the orifice 7 be opened gently, the fluid contained in the chamber 8 will flow in proportion to the size of the aperture formed and the pressure will fall in the chamber 8 while this pressure P multiplied by the surface S of the washer is greater than or at least equal to the pressure exerted by the fluid upon the surface of the crown 2—2 on the other side. At this moment, if the orifice is further opened, the washer will rise and the fluid is able to pass through the conduit 4 in such a manner that on opening the orifice 7 to a greater or less extent, by an infinitesimal quantity, quantities of fluid varying with the aperture of the orifice 7 are allowed to pass out through the conduit 4, these quantities increasing in proportion to the magnitude of the movement of the washer, and as the periphery or contour of the orifice 4 is greater.

By an aperture given to the conduit 7 the movement of the washer is larger in proportion as the quantity of fluid that is able to pass around the washer is smaller. The diameter of the washer relatively to the diameter of the chamber is therefore of importance; it should be regulated in taking into account the extent of the movement of the part 9 which obturates the orifice 7 and also the periphery of the orifice that it obturates.

The orifices 7 and 4 may be simple or multiple and their form and periphery may vary as desired from a circular hole to orifices, holes or slots with a plaited contour so as to increase the periphery without increasing the section, stars, parallel slots, herring boned, etc.

The total effect depends upon the quantity of fluid to be utilized, the force and the amplitude of the initial movement of the part 9 to which the movement that is to be amplified has been imparted no matter what the origin of this movement may be.

The apparatus described above is a simple relay but obviously in the case of high power apparatus that it is desired to operate by means of a weak movement (an electrical movement for example) the obturation of the orifice 7 may be utilized for displacing a washer 31 which will itself serve to obturate a current of air capable of displacing a larger washer thus forming a double, triple or more complex relay depending in all cases upon the same supply of fluid.

The washers employed in this relay may be of any suitable material steel, aluminium or the like, celluloid, indiarubber, paper or the like, according to the fluids employed. The description applies to a circular washer but it is obvious that this movable part may present any desired form such as square or polygonal, regular or irregular. It may be rigid or soft; if it is rigid it should be perfectly plane and accurately fit against the lips of the orifice. If it is soft the orifices need not be absolutely plane because the pressure is then able to deform the washer and cause it to fit the edges.

It is necessary to exercise the greatest care as to the obturation of the orifice 7. There is a great difference between the manner in which the vibrating part obturates this orifice in this relay, and the manner of obturating the orifices in the appliances heretofore suggested for amplifying sounds by the expansion of fluids.

When movements are obtained by means of valves, lamellæ or membranes obturating the fluid stream in the appliances heretofore suggested, the movement obtained increases in amplitude in proportion as the obturating part more closely approaches absolute obturation, because the sound is a function of the larger or smaller differences of pressure in the horn or mouthpiece and these are larger in proportion as the successive volumes differ more widely. In the relay according to the present invention, on the other hand, the part obturating the orifice 7 serves only for producing the movement of the washer 31; the latter does not move except when the obturating part 9 has separated from the orifice 7 sufficiently for the quantity of fluid passing through this orifice to be greater than that which passes between the periphery of the washer 31 and the inner wall of the chamber. If this quantity of fluid be increased by decreasing the diameter of the washer, that is to say by increasing the passage of the fluid, it is necessary to open the orifice 7 rather more in order to obtain the movement of the washer and consequently the obturating part must carry its movement farther. It follows that the object of this movement is merely to obtain a variation of pressure in the interior, so that the part 9 (valve or lamella) is able to move to a sufficient distance from the orifice to prevent atmospheric dust from forming an obstacle and so that the surfacing need not be so absolutely accurate.

In Fig. 3, which represents a commercial form of the apparatus, the fluid under pressure passes through the conduit 11 into a body 10 and this fluid becomes distributed in the cavity 12 and is able to pass over the lips of the orifice 13 and enter the mouthpiece. The body of this apparatus is surfaced in such a manner that at the point 14 it is absolutely in the same plane as the lips of the orifice 13. By means of the screw 15 an internally screw threaded washer is screwed to the body of the apparatus; at 16 this washer presents a cylindrical part in which the washer 17 is introduced. A screw plug 18 is screwed on to the part 16 and enters the cylindrical part in which the washer is fitted, in such a manner as to form a small chamber in which the washer moves. Upon the face 19 of this plug the small grooves or lines previously referred to are formed; these are shown in Fig. 4. These grooves or lines unite in a central conduit 22 ending at an orifice 20, the form of which is adapted to requirements; this orifice is obturated by the part 21 as described at the commencement of this description. This arrangement enables the condition of the movable washer to be checked at any moment and permits of removing any foreign bodies that may have entered the apparatus.

In Fig. 5 the fluid enters the body 23 and the circular cavity 26 as in the preceding arrangements but the washer forms a joint in the body and is able to slide without allowing any fluid to pass; in this case the quantity of fluid necessary for the operation of the relay passes from the front to the rear of the washer through conduits 25, the dimensions of which may be permanently regulated or be regulated by an orifice, the size of which can be modified by means of a pin valve cock 30 (Fig. 5). With this arrangement the movable and free washer may even be replaced by a fine, flexible or soft membrane.

The device is especially adapted to amplifying the sounds produced by phonographs, graphophones, telephone instruments and the like. In such devices where the sound vibrations are more or less feeble and more or less complex, it is desirable that the relays should be exceedingly sensitive to such vibrations. The action of the relay, when employed for such purposes, is improved by making the washer quite thin, thereby reducing its weight and increasing its flexibility and its responsiveness to the primary actuating means. The space between the washer and the casing on the side opposite the orifice obturated by the washer may also be quite small inasmuch as but slight lateral play is required by the washer.

What we claim and desire to secure by Letters Patent of the United States is:—

1. An energy relay comprising a housing, orifices for the passage of fluid through said housing, a washer, movably mounted in said housing and controlling the passage way through one of said orifices, said washer being of smaller dimensions than the housing whereby fluid may pass to both sides of the washer, and means for varying the pressure on one side of said washer with respect to that on the other.

2. An energy relay comprising a housing, orifices for the passage of fluid through said housing, a washer movably mounted in said housing, and controlling the passage way through said orifices, the parts of the housing on either side of said washer being in communication with each other, and means for varying the pressure on one side of said washer with respect to that on the other.

3. An energy relay comprising a housing, orifices for the passage of fluid through said housing, an obturating element movably mounted in said housing, and controlling the passage way through said orifices, the parts of the housing on either side of said obturating element being in communication with each other, and means for varying the pressure on one side of said obturating element with respect to that on the other.

4. An energy relay, especially for amplifying speech and sound vibrations, comprising a housing, an admission orifice for a current of fluid and a principal exit orifice, a disk controlling said exit orifice, said disk being thin, light and flexible and having but slight movement away from the said orifice, the parts of the housing on either side of said disk being in communication with each other, an exit from said housing at the rear side of said disk, and means for modifying the current of fluid escaping from said last-named exit.

5. An energy relay, especially for amplifying speech and sound vibrations, comprising a housing, an admission orifice for a current of fluid and a principal exit orifice, a disk controlling said exit orifice, said disk being thin, light and flexible and having but slight movement away from said orifice, an adjustable cap closing the end of said housing opposite said exit orifice, whereby the space in the rear of said disk may be varied, the parts of the housing on either side of said disk being in communication with each other, an exit from said space, and means for modifying the current of fluid escaping from said last-named exit.

6. An energy relay comprising a housing, orifices for the passage of fluid through said housing, an obturating element controlling one of said orifices exposed to pressure on both sides thereof and means for varying the pressure on one side of said element with respect to that on the other, the end of the housing behind said obturating element being provided with grooves or channels to prevent sticking of said element.

7. An energy relay comprising a housing, orifices for the passage of fluid through said housing, an obturating element controlling one of said orifices exposed to pressure on both sides thereof and means for varying the pressure on one side of said element with respect to that on the other, and a cap at the end of the housing behind said obturating element having upon its inner face grooves or channels to prevent sticking of said element.

8. An energy relay comprising a housing, orifices for the passage of fluid through said housing, an obturating element controlling one of said orifices exposed to pressure on both sides thereof and means for varying the pressure on one side of said element with respect to that on the other, and a cap at the end of the housing behind said obturating element having a recessed inner face and grooves or channels on said face to prevent sticking of said element.

In witness whereof, we have hereunto signed our names in the presence of two subscribing witnesses.

GEORGES LAUDET.
LÉON GAUMONT.

Witnesses:
DEAN B. MASON,
GABRIEL BELLIARD.